May 28, 1929.  J. LEWIS  1,715,202
HEATING SYSTEM
Filed Dec. 19, 1927   2 Sheets-Sheet 1
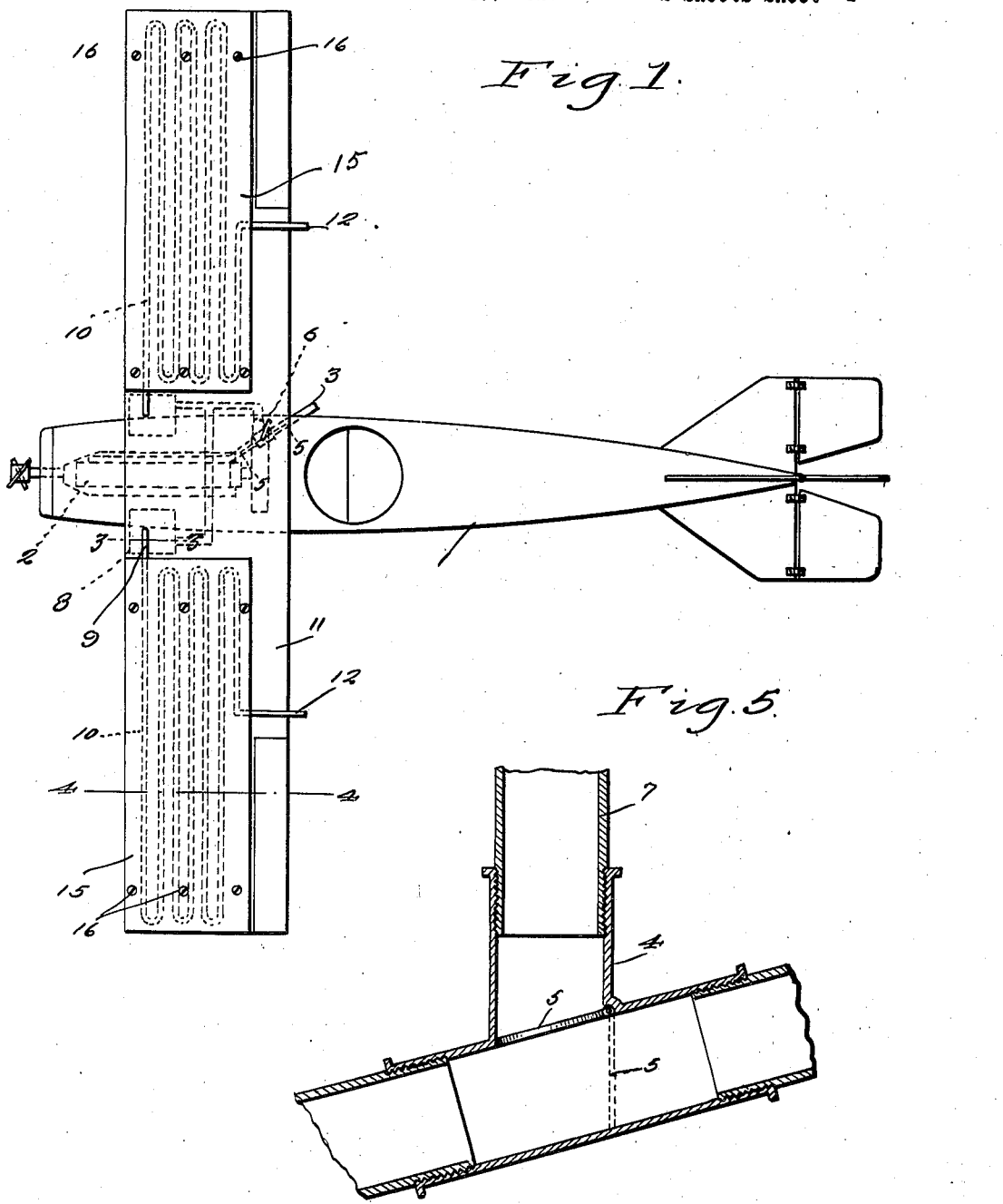

May 28, 1929.  J. LEWIS  1,715,202
HEATING SYSTEM
Filed Dec. 19, 1927   2 Sheets-Sheet 2
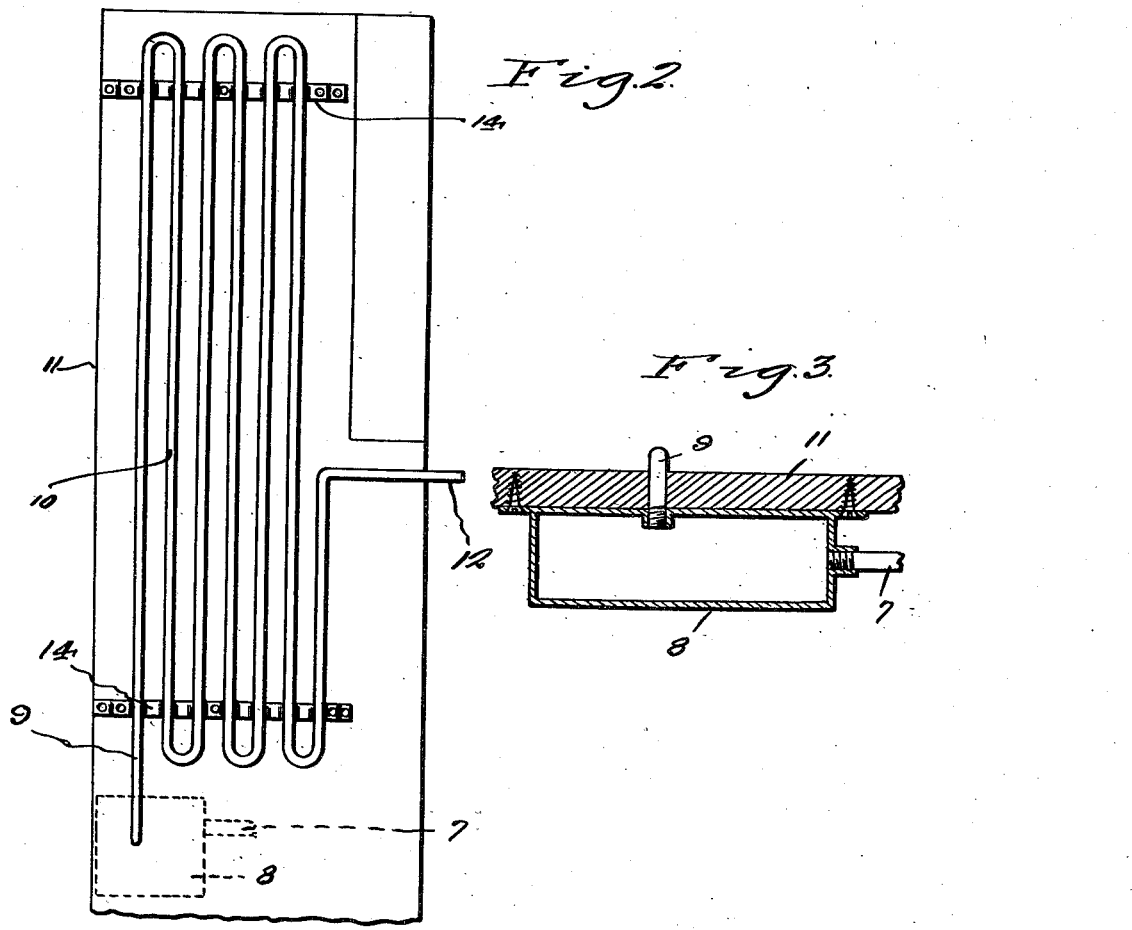
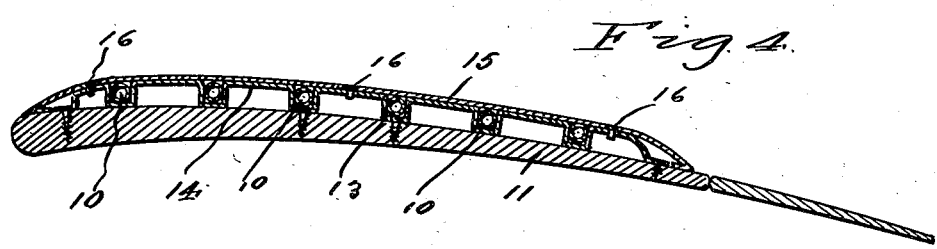
John Lewis INVENTOR
BY Victor J. Evans
ATTORNEY
WITNESS:
R. Q. Thomas Patented May 28, 1929.

1,715,202

UNITED STATES PATENT OFFICE.

JOHN LEWIS, OF ST. LOUIS, MISSOURI.

HEATING SYSTEM.

Application filed December 19, 1927. Serial No. 241,220.

Aviators flying their machines through certain altitudes during certain climates especially cool climates will have the planes or wings of their machines coated with ice and snow which materially adds to the weight of the craft and thereby materially hinders its operation. Also the planes or wings of aircrafts have become soaked by rain which renders such parts of the machine soggy and heavy so that the machine will not function at its usual or ordinary capacity and the foregoing conditions have frequently resulted in disasters to aircrafts.

It may, therefore, be considered the primary object of this invention to provide a means for protecting and heating the planes or wings of an aircraft to prevent the accumulation of ice, snow or moisture thereover and consequently overcome the tendency of these elements interfering with the flight of the machine.

A further object is the provision of means for heating the wings or planes of aircrafts and consequently preventing the same from becoming soaked or soggy by water or being weighted by rain, frost or snow and which heat from the exhaust of the engine for the plane is caused to circulate over such planes or wings, and further wherein the radiator coils through which the heat is conducted are themselves protected by the arched cover plate which affords the planes or wings with a water-shed.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a top plan view of an air craft equipped with the improvement.

Figure 2 is a plan view of one of the wings or planes provided with a heat conducting radiator coil in accordance with this invention, the cover plate or water-shed being removed.

Figure 3 is a sectional view approximately on the line 3—3 of Figure 1.

Figure 4 is an enlarged sectional view approximately on the line 4—4 of Figure 1.

Figure 5 is a detail sectional view on an enlarged scale and approximately on the line 5—5 of Figure 1.

The body of an aircraft, in the drawings, is indicated by the numeral 1. The operating engine for the craft is disclosed by the dotted lines and is indicated by the numeral 2. The engine 2 is provided with the usual angularly disposed exhaust pipe 3. In the present instance, the exhaust pipe 3 has an angle branch pipe 4 and the passage between this branch and the exhaust pipe proper is controlled by a swingable valve 5 having an operating handle 6 which is arranged in close proximity to the said occupants of the cockpit in the body 1. The branch pipe 4 has pipe connections 7 with heat retaining compartments 8. The heaters 8 are arranged in close proximity to the sides of the engine and are thus heated therefrom. Each of the heaters 8 has connected with its top one end of a pipe member 9. The pipe 9 forms one of the elements of pipe coils 10, the said coils being arranged longitudinally around and over the top of the planes or wings 11 for the craft. The outer pipe section of each of the coils 10 is centrally formed with a rearwardly extending branch 12 that provides the outlet for the coil.

In order to effectively sustain the parallel and longitudinally arranged members of the coils 10 on the planes, these members are received in depressions or pockets 13 which are integrally formed in a metal strip 14. The strip, with its depressions that afford the pockets 13, provides a spacer member or rack for the longitudinal branches of the coils 10. The ends of each of the strips 14 are rounded or bent downwardly into contact with the top of the wings or planes 11, and are secured thereto. In addition to this other and similar securing means may pass through the lower walls formed by the pockets 13.

Arranged over the spacer member or rack strips 14 there are thin metal cover plates 15. These plates are substantially arched in cross section, the ends thereof being rounded downwardly and being bent inwardly and if desired, secured to the planes or wings, and likewise being connected by means 16 to the spacer members or racks 14.

The operator by swinging the valve 5 will direct the exhaust heat from the engine into the heater compartments 8 and from thence into the coil pipes. The heat conducted through the coils will retain the wings or planes in a warm condition and will likewise impart heat to the arched cover plates 15. This heat will prevent any accumulation of moisture, sleet, snow or the like on the planes so that an aircraft equipped with the improvement will not be subjected to soggy or weighted wings or planes and can effectively make flights through altitudes and during weather conditions which might prove to aircrafts, not equipped with the improvement, disastrous.

Having described the invention, I claim:

1. The combination with an aircraft having wings and an operating engine, of heat compartments, a valve controlled means for directing the exhaust heat from the engine into the compartments, coil pipes leading from the compartments and disposed over the respective wings or planes of the craft and a comparatively thin metal arched cover plate for the coils.

2. The combination with an aircraft having wings and an operating engine, of heat compartments, a valve controlled means for directing the exhaust heat from the engine into the compartments, coil pipes leading from the compartments and disposed over the respective wings or planes of the craft, metal racks secured on the wings or planes and having pockets in which the longitudinal pipe members of the coils are received and a cover plate having downwardly rounded ends disposed over the rack and over the coils and secured to the rack and to the wings of the plane.

In testimony whereof I affix my signature.

JOHN LEWIS.